Patented June 13, 1933

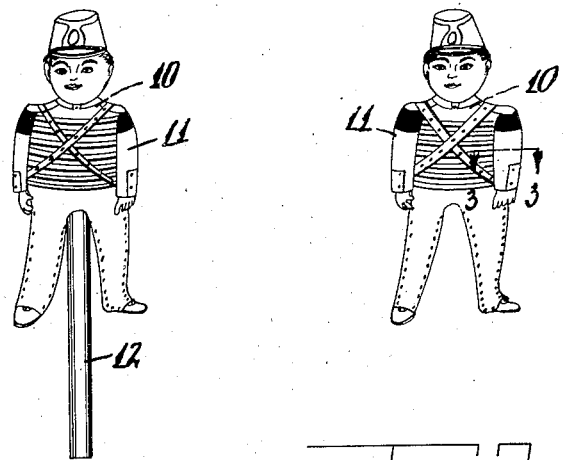
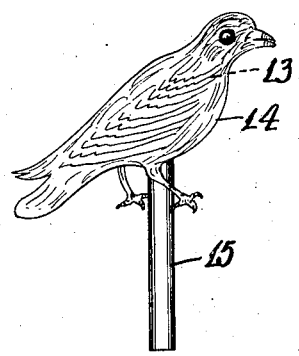
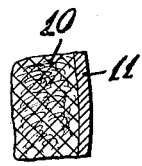
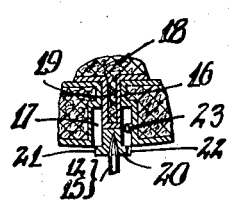

1,913,851

UNITED STATES PATENT OFFICE

SABIN OPREAN, OF GRANTWOOD, NEW JERSEY, ASSIGNOR TO THE POPSICLE CORPORATION OF THE UNITED STATES, OF NEW YORK, N. Y., A CORPORATION OF DELAWARE

CHOCOLATE COVERED ICE CREAM FIGURE

Application filed March 29, 1929, Serial No. 350,967. Renewed October 29, 1932.

This invention relates to new and useful improvements in confections.

The invention has for an object the provision of an article of the class mentioned which is of simple attractive construction and which may be manufactured and sold at a reasonable cost.

The invention proposes a molded or otherwise shaped figure of ice cream covered with chocolate, forming a confection, said figure being that of an animal, flower, doll or the like and arranged with or without a support stick. One of the limbs, elements or members of the figure may be movably connected with the other parts thereof to provide a slight entertaining feature.

For further comprehension of the invention and of the objects and advantages thereof, reference will be had to the following description and accompanying drawing, and to the appended claims in which the novel features are more particularly set forth.

In the accompanying drawing forming a material part of this disclosure:—

Fig. 1 is a front elevational view of an article constructed according to this invention.

Fig. 2 is a front elevational view of a modified form of the article.

Fig. 3 is a fragmentary horizontal sectional view taken on the line 3—3 of Fig. 2.

Fig. 4 is a side elevational view of another modified form of the article.

Fig. 5 is a fragmentary vertical sectional view of the various articles shown.

The reference numeral 10 indicates generally a molded or otherwise shaped figure of a doll and made from ice cream, and numeral 11 indicates a chocolate covering upon the figure 10. A support stick 12 is engaged into the body of the article for providing a convenient handle. The head of the doll may be movably arranged as hereinafter further described.

In Fig. 2 the doll has been shown without the support stick 12. For handling this article it is necessary to manually engage it.

In Fig. 4 a molded or otherwise shaped figure 13 has been shown in the form of a bird, and numeral 14 indicates chocolate covering thereon. A support stick 15 engages in the bottom of the body for handling purposes. The wing of the figure may be movably arranged as hereinafter described.

In Fig. 5 the body of a figure has been shown and is provided with a vertical aperture 16 terminating at its bottom in an enlarged portion 17. The body is of ice cream and chocolate covered. A movable member constituting one of the limbs, elements or members of the body is generally indicated by reference numeral 18 and is provided with a depending portion 19 passing thru the aperture 16. A piece of dried fruit or candy 20 is attached upon the lower end of the portion 19 and is formed with a bottom flange 21 having a peripheral cut-out 22. The flange may engage in the enlarged portion 17 and a projection 23 from the body extends into the large opening and is of a size to permit the flange 21 to pass with the cut-out portion 22 partially encircling the projection. A support stick 12 is engaged into the bottom of the dried fruit or candy 20 and may be used to move the movable member upwards relative to the body and then slightly turned for moving the cut-out 22 out of line from the projection 23 so that the movable member is retained in a raised position. This feature provides slight entertainment for a purchaser of the article. All of the parts are eatable except the support stick.

While I have shown and described the preferred embodiment of my invention, it is to be understood that I do not limit myself to the precise construction herein disclosed, and the right is reserved to all changes and modifications coming within the scope of the invention as defined in the appended claims.

Having thus described my invention, what I claim as new, and desire to secure by United States Letters Patent is:—

1. In a chocolate covered ice cream figure of the class described, a body formed with an aperture terminating in an enlarged opening, a movable member with a portion engaging in said aperture, and coactable means on said body and movable member for retaining the movable member in a raised position.

2. In a chocolate covered ice cream figure of the class described, a body formed with an aperture terminating in an enlarged opening, a movable member with a portion engaging in said aperture, and coactable means on said body and movable member for retaining the movable member in a raised position, said means comprising an element attached on said movable member within said enlarged opening and formed with a flange having a cut, and a projection from said body member to hold said flange in an elevated position except in a position of rotation in which said cut can pass said projection.

3. In a chocolate covered ice cream figure of the class described, a body with a vertical aperture termination at the bottom in an enlarged portion, a movable member with a depending portion engaging through the aperture, a member formed at the bottom with a flange having a peripheral cut-out, and a projection from the body within the enlarged portion of the aperture capable of passing through the said cut-out.

4. A combination ice cream and candy confection comprising a body of frozen edible material having an opening extending longitudinally through said body and a movable candy member having a stem extending into said opening, and means for frictionally holding said stem in said opening and permitting said stem to be manipulated for raising, lowering or rotating said candy member.

In testimony whereof I have affixed my signature.

SABIN OPREAN.